United States Patent [19]

Clow et al.

[11] Patent Number: 5,614,237
[45] Date of Patent: *Mar. 25, 1997

[54] APPARATUS AND METHOD FOR MAKING LATTICE BAKED FOOD PRODUCTS

[75] Inventors: Andrew E. C. Clow, High Wycombe; Brian D. Hill, Sutton Coldfield; Debra Rycraft, Thames Ditton, all of United Kingdom

[73] Assignee: United Biscuits (UK) Limited, Middlesex, United Kingdom

[*] Notice: The term of this patent shall not extend beyond the expiration date of Pat. No. 5,576,041.

[21] Appl. No.: 363,696

[22] Filed: Dec. 23, 1994

[30] Foreign Application Priority Data

Jun. 10, 1994 [GB] United Kingdom ............... 9411664

[51] Int. Cl.⁶ .......................................... A21C 11/04
[52] U.S. Cl. .................... 426/144; 426/94; 426/391; 426/496; 426/502; 426/549; 425/335; 425/363
[58] Field of Search ..................... 426/144, 289, 426/496, 502, 512, 94, 549, 391; 425/335, 363, 327

[56] References Cited

U.S. PATENT DOCUMENTS

| | | | |
|---|---|---|---|
| 1,566,771 | 12/1925 | Perky | 425/363 |
| 2,405,661 | 8/1946 | MacManus | 426/503 X |
| 2,567,248 | 9/1951 | Stahmer | 426/518 |
| 3,394,431 | 7/1968 | Nalle, Jr. | 425/327 X |
| 4,289,470 | 9/1981 | Johnston et al. | 425/336 |
| 4,508,739 | 4/1985 | Ryan | 426/144 |
| 4,601,227 | 7/1986 | Fitzwater et al. | 426/144 |
| 4,618,498 | 10/1986 | Thulin | 426/503 X |
| 4,650,684 | 3/1987 | Penrose | 426/144 |
| 4,680,191 | 7/1987 | Budd et al. | 426/439 |
| 4,717,328 | 1/1988 | D'Alterio | 425/290 |
| 4,937,084 | 6/1990 | Julian | 426/144 |
| 4,973,481 | 11/1990 | Hunt et al. | 426/144 |
| 5,308,633 | 5/1994 | Gardner | 426/503 |
| 5,402,715 | 4/1995 | Kurachi et al. | 425/294 X |

FOREIGN PATENT DOCUMENTS

| | | |
|---|---|---|
| 0387606 | 9/1990 | European Pat. Off. . |
| 713925 | 8/1954 | United Kingdom . |
| 1331042 | 9/1973 | United Kingdom . |
| 1466018 | 3/1977 | United Kingdom . |
| 1499225 | 1/1978 | United Kingdom . |

OTHER PUBLICATIONS

Patent Publication WO 91/05483.
Patent Publication WO 92/10101.

Primary Examiner—Steven Weinstein
Assistant Examiner—Lien Tran
Attorney, Agent, or Firm—Lockwood, Alex, Fitzgibbon & Cummings

[57] ABSTRACT

Baked food products are produced by forming a flat sheet of dough and feeding the sheet to a nip between a pair of contra-rotating rollers arranged with their curved surfaces in contact with each other, and each of the rollers has grooves indented into its curved surface. The rollers push the dough into the grooves and form the dough into a lattice comprising an array of ridges imparted to the dough by one of the rollers, which ridges are spaced apart from and extend in substantially the same direction as each other, and an array of ridges imparted to the dough by the other roller, which ridges are spaced apart from and extend in substantially the same direction as each other. The direction in which the ridges of one array extend are at an angle to that of the other array so that the ridges of one array intersect the ridges of the other, and the contacting portions of the curved surfaces of the rollers form apertures in the dough between the intersecting ridges. Portions are cut from the dough lattice and the portions are baked to provide baked food products having a lattice configuration.

33 Claims, 5 Drawing Sheets

APPARATUS AND METHOD FOR MAKING LATTICE BAKED FOOD PRODUCTS

The invention relates to the production of food products, and especially to the production of baked food products, more especially, biscuits.

It has previously been proposed in International Patent Application No. WO 92/10101 to produce biscuits having a corrugated configuration by feeding a flat sheet of dough to a pair of corrugated rollers arranged to impart corrugations to the sheet. The resulting corrugated biscuits formed from the sheet break more easily along a line in a direction along the corrugations than along a line in a perpendicular direction.

The present invention provides a process for producing baked food products, which comprises forming a flat sheet of dough and feeding that sheet to a nip between a pair of contra-rotating rollers arranged with their axes parallel to each other and with their curved surfaces in contact with each other, each of the rollers having grooves indented in its curved surface, and wherein the rollers push the dough into the grooves and form the dough into a lattice comprising an array of ridges imparted to the dough by one of the rollers, which ridges are spaced apart from each other and extend in substantially the same direction as each other, and an array of ridges imparted to the dough by the other roller, which ridges are spaced apart from each other and extend in substantially the same direction as each other, the direction in which the ridges of one array extend being at an angle to that of the other array so that the ridges of one array intersect the ridges of the other, and the contacting portions of the curved surfaces of the rollers provide apertures in the dough between the intersecting ridges, and the process further comprises cutting portions from the dough lattice and baking the portions to provide food products having a lattice configuration.

The process of the invention enables the production of a baked food product, which will be hereinafter referred to as a "biscuit", which has an attractive appearance by reason of its lattice structure, and which breaks down easily in the mouth. The biscuits may be made from a variety of doughs of different compositions, and may be made from one or more of the following: wheat, maize, potato and rice. In addition, the dough may contain fat, and/or it may contain sugar.

Advantageously, the dough is formed into a flat sheet before it is fed to the grooved rollers by passing it between one or more pairs of smooth rollers. The grooved rollers then act on the sheet of dough to redistribute the dough, portions of the sheet that encounter the contacting portions of the curved surface, or lands, of the rollers being pushed into the grooves to provide the ridges, and apertures being formed where the lands contact each other.

The term "ridges" is used throughout the specification to refer to the whole of the dough of which the lattice is composed and is not intended to imply the presence of any dough other than that in the ridges. The term "ridges" is used partly because each portion of the dough contained in a ridge will often (but not necessarily) have a V-shaped profile as discussed below, but also because the ridges stand proud of the mean thickness of the dough.

The angle at which the ridges imparted to the dough by one of the rollers intersect the ridges imparted to the dough by the other roller, together with the width of the lands between the ridges, define the shape of the apertures between them. If as is often preferred the ridges of one array intersect the ridges of the other array at an angle of substantially 90°, the shapes of the apertures between the ridges of the dough at least immediately before it leaves the rollers are substantially rectangular. Preferably, the apertures are substantially square. It may, however, be desired for the ridges of one array to intersect the ridges of the other array at an angle other than substantially 90° so as to obtain apertures of which the shapes are parallelograms that are not rectangles or squares.

It will generally be found that the dough lattice is released without difficulty from the grooved rollers, but also that the lattice stretches easily. Care should therefore be taken on removal of the dough lattice from the grooved rollers and in subsequent handling of the dough lattice in order to avoid undesired distortion. That stretching characteristic can, however, be used to allow the shape of the apertures in the lattice to be altered as the dough leaves the rollers by adjusting the tension of the dough lattice. Thus, for example, square apertures having their diagonals extending in the direction of travel of the dough can be altered to rhomboidal apertures, if desired, by increasing the tension. Equally, square apertures with pairs of sides extending in the direction of travel of the dough can be altered to rectangular apertures. Such an increase in tension can be achieved by adjusting the speed of a conveyor arranged to transport the dough lattice from the rollers.

In the process of the invention, one of the rollers may be formed with an array of longitudinally-extending grooves and the other roller may be formed with an array of grooves extending circumferentially. That arrangement will be referred, to hereinafter as "the longitudinal/circumferential arrangement".

Alternatively, one or both of the rollers may be formed with one or more grooves extending helically around the roller. Thus, one or both of the rollers may be formed with only a single groove (and, correspondingly, only a single land) extending helically around the roller from one end to the other. Accordingly, the expressions "grooves" and "lands" where they are used in this specification to refer to one roller should be interpreted as including a reference to a single continuous helically-extending groove and a single continuous helically-extending land, respectively. When the rollers are both provided with helically-extending grooves, the arrangement is preferably such that the ridges of both of the arrays imparted to the dough preferably extend in directions which are inclined at angles of substantially 45° to the direction of travel of the dough between the rollers, the ridges of one array being inclined in the opposite sense to the ridges of the other array. That arrangement of grooved rollers will be hereinafter referred to as "the 45° helical arrangement". With such an arrangement, it will usually be found necessary for each roller to be formed with a series of helically-extending grooves, which may be arranged in parallel with each other, rather than only a single groove, because if only a single helically-extending groove were provided on each roller the ridges imparted to the dough would not generally be close enough together to provide a recognisable lattice having an acceptable number of ridges and apertures in the finished biscuit.

When it is desired to form a dough lattice in which the two arrays of ridges intersect at an angle of substantially 90°, the 45° helical arrangement of grooved rollers may be preferred to the longitudinal/circumferential arrangement because, with such a helical arrangement, the cross-sectional area of the grooves in the nip of the grooved rollers remains substantially constant as the rollers rotate so that dough is accepted by the rollers at a substantially constant rate. With the longitudinal/circumferential arrangement, the cross-sectional area of the grooves in the nip varies periodically with the rotation of the roller having the longitudinal grooves.

Also, as the dough emerges from the grooved rollers having the 45° helical arrangement, the rate at which the area of the surface of the dough moves out of contact with the rollers is substantially constant, whereas with the longitudinal/circumferential arrangement that rate increases periodically as each ridge produced by the longitudinally-extending grooves moves out of contact with the roller and then decreases.

In deciding on the lattice design required in the final biscuit, and hence the dimensions and spacing of the grooves on the rollers, allowance should be made for the composition of the dough being used and the amount by which it increases in volume, during baking. Such an increase in volume can lead to a decrease in the size of the apertures or even complete closing of the apertures. Allowance should also be made for elastic recovery or relaxation of the dough after leaving the rollers. It may be found that there is distortion of the ridges and of the overall shape of the food product after cutting of the dough and during baking, but some distortion is not necessarily undesirable and may, in fact, enhance the appearance of the finished biscuits.

The cross-sectional area of the grooves on each roller should not be so small, and/or the width of the lands so large, that the biscuits are too fragile. On the other hand, thick ridges can result in biscuits that are too tough or hard. Thicker ridges and/or narrower lands can, however, be acceptable in a biscuit having a higher fat and/or sugar content.

It has been found unnecessary for the grooved rollers to produce any significant reduction in the piece weight of the dough entering and leaving the rollers. (The term "piece weight" is used in this specification to mean the weight of a piece of dough removed from the sheet by impressing on the sheet a circular cutter having an internal diameter which is large by comparison with the size of the apertures in the resulting lattice, the cutter being so applied to the sheet that it does not extend beyond the edge of the sheet.) It can, however, readily be arranged that there is some reduction in piece weight at the grooved rollers if it is desired.

The cross-sectional area of the grooves in the nip of the rollers at any instant should generally be sufficient to accept the volume of dough supplied to the rollers at that instant without undue compression of the dough, and without excess force being exerted on the rollers, which might cause them to move apart and out of contact with each other at least over a part of their length. Equally, the thickness of the sheet of dough supplied to the nip of the rollers, and the speed at which it is supplied, must be sufficient to ensure that, at a given rate of rotation of the rollers, the grooves are filled by the dough so that a well-defined dough lattice results.

In practice it will be found that once the number, dimensions and spacing of the grooves in the rollers have been selected taking into account the composition of the dough, then the rate of supply of dough to the grooved rollers and the rate of rotation of the rollers can readily be adjusted to give the required lattice configuration to the dough. It may, however, be found that the requirement that contact between the curved surfaces of the rollers be maintained along their length throughout operation of the process imposes a limitation on the length of the rollers that can be used because of the deformability of the rollers.

The grooves may each have a rounded profile or they may each have side walls that are straight in profile and have a flat or curved base. In that case, the side walls may be arranged so that they are parallel to each other and meet the curved surface of the roller at an angle of 90°. Advantageously, however, each groove has side walls that are inclined towards each other in a direction towards the base of the groove, and preferably has a substantially V-shaped profile and a pair of side walls that meet at the base of the groove at an angle within the range of from 60° to 120°, preferably from 90° to 110°. The depth of each groove is advantageously within the range of from 0.50 to 2.50 mm, preferably from 0.75 to 1.50 mm. The width of each groove at the curved surface of the roller is advantageously within the range of from 1.73 to 8.66 mm, preferably from 2.14 to 3.00 mm. The width of each land between adjacent grooves is advantageously within the range of from 1.00 to 8.00 mm, preferably from 2.00 to 3.00 mm. The dimensions of each groove are advantageously so selected from the above ranges that the cross-sectional area of each groove is within the range of from 0.43 to 10.82 $mm^2$, and preferably from 0.80 to 2.25 $mm^2$. Once the dimensions of the grooves have been selected, the width of the lands can be chosen to give apertures of the desired size in the lattice taking into account the considerations of fragility of the lattice and increase in volume of the dough during baking as discussed above.

The grooves are advantageously such that the ridges imparted to the dough extend along straight lines, and the ridges are substantially parallel to each other. Alternatively, the grooves may be such that the lines along which the ridges extend are wavy and, in that case, the spacing between adjacent ridges (and the widths of the lands of the rollers) may vary along their lengths. It will, however, usually be preferred that the lands of the rollers are of uniform width so that the ridges of each array imparted to the dough are uniformly spaced from each other and the dough lattice has a uniform mesh. It is, however, possible to arrange that the width of adjacent lands vary so that a dough lattice emerges from the rollers having a wider "mesh" over one or more portions of its width than over others.

In practice, on starting operation of the process, it may be found advantageous for the grooved rollers to be out of contact with each other initially. Then, as the dough is engaged by the grooved rollers, the gap between the rollers can be closed until the curved surfaces of the rollers contact each other along their length and the dough lattice is formed.

The biscuits made by the process of the invention may be formed from doughs that include additional food items or "inclusions", for example, herbs in comminuted form, that are admixed with the dough prior to passing it between the grooved rollers. After baking, the biscuits may be treated by the addition of one or more substances to their outer surfaces. For example, a biscuit may have its outer surface sprayed with oil, dusted with sugar, salt or cheese or be coated on one surface with chocolate. In the latter case, the chocolate should generally be sprayed onto the biscuit so that the chocolate does not completely close the apertures in the lattice.

The biscuits may also be made from a plurality of (for example, two or three) sheets of dough (which sheets may have different compositions) which are fed, one on top of another, to the grooved rollers. The doughs of the layers may each be of different colour so that the finished biscuit has a marbled appearance.

The invention also provides apparatus suitable for carrying out the process of the invention, the apparatus comprising a pair of rollers arranged for rotation in opposite senses with their axes parallel to each other and with their curved surfaces in contact with each other, each of the rollers having an array of grooves indented in its curved surface, and means for feeding a sheet of dough to the nip between the rollers, the grooves of one of the rollers being spaced apart from each other and extending in substantially the same direction as each other, and the grooves of the other roller being spaced apart from each other and extending in substantially the same direction as each other, the direction in which the grooves of one array extend being at an angle to that of the other array so that, in the nip between the rollers, the grooves of one array intersect the grooves of the other, and the portions of the curved surfaces of the rollers between the grooves are in contact with each other, and the apparatus further comprises means for cutting portions from the dough lattice and means for baking the portions cut from the dough lattice.

When dough is supplied to the nip between the rollers at a suitable rate, and the rate of rotation of the rollers is suitably selected (which can readily be achieved in practice), then, upon rotation of the rollers, the grooves will be filled with the dough without undue compression of the dough producing ridges of dough, and apertures will be provided where the lands contact each other, so that a dough lattice emerges from the rollers.

In one arrangement of the apparatus, one of the rollers may have an array of longitudinally-extending grooves and the other roller may have an array of grooves extending circumferentially. Alternatively, one or both of the rollers may have one or more grooves extending helically around the roller, preferably at an angle of 45° to the axis of the roller.

The apparatus of the invention may also incorporate any of the other features used for carrying out the process of the invention referred to above.

The invention also provides a baked food product or biscuit having a lattice configuration produced by the process of the invention.

A process for the production of baked food products in accordance with the invention, and a modification of that process, will now be described, by way of example, with reference to the accompanying drawings, in which.

Figure 1:
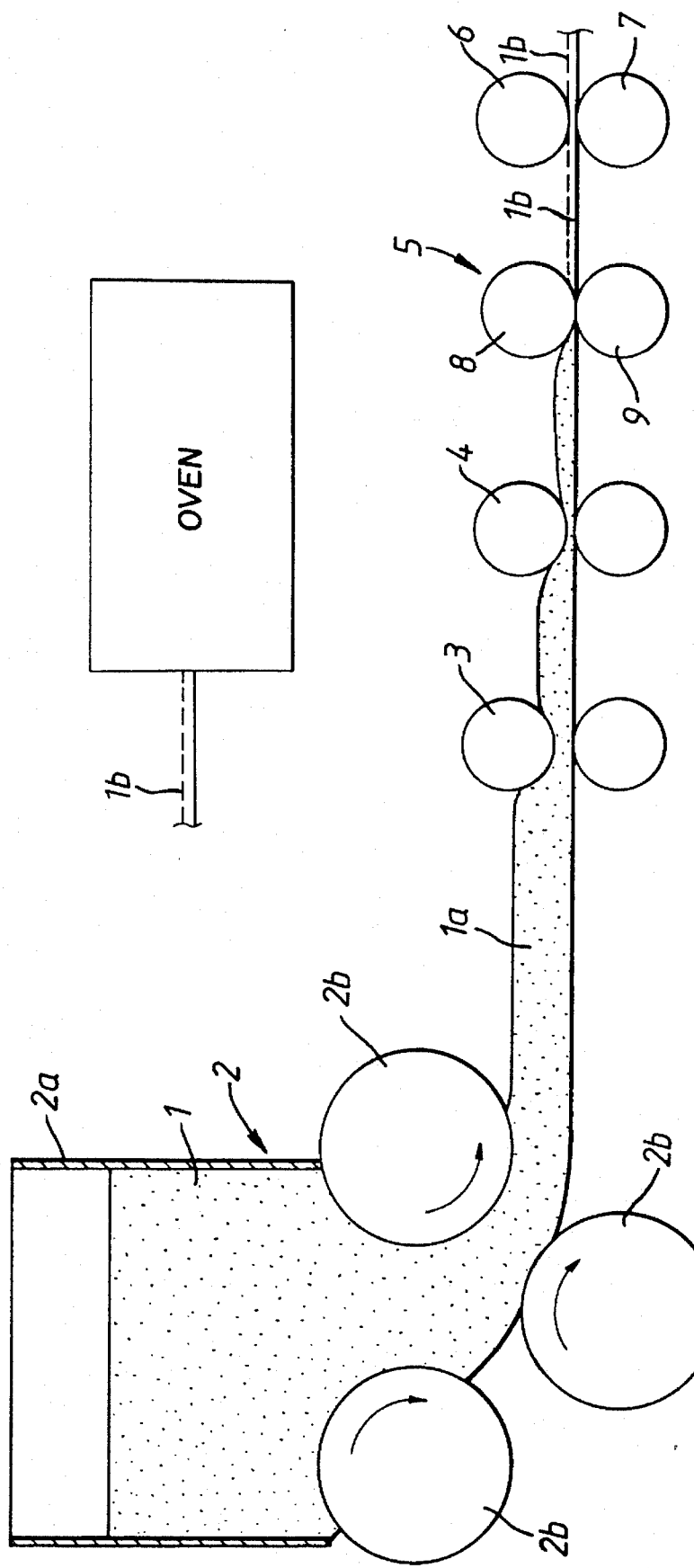
FIG. 1 is a broken, diagrammatic side view of apparatus for forming a dough lattice, cutting out portions from the lattice in the process of the invention and baking the product.

Referring to FIG. 1 of the accompanying drawings, in the process of the invention, dough 1 formed in a mixer (not shown) is fed into a hopper 2a of a three-roll sheeter, indicated generally by the reference numeral 2. The three-roll sheeter 2 comprises three rolls 2b arranged to form the dough 1 into a flat sheet 1a, which emerges from the sheeter 2, and is fed by a conveyor (not shown) to a nip between a first pair of gauge rollers 3 and then by means of a second conveyor (not shown) to a nip between a second pair of gauge rollers 4. Each pair of the gauge rollers 3 and 4, respectively, reduces the thickness of the sheet 1a.

From the second pair of gauge rollers 4, the flat sheet 1a of dough is fed by means of a third conveyor (not shown) to a nip between a pair of grooved rollers, indicated generally by the reference numeral 5, which are shown on a larger scale in, and described in more detail with reference to, FIGS. 2, 3 and 4. The grooved rollers 5 form the dough into a lattice 1b as described in more detail below. The dough lattice 1b emerging from the grooved rollers 5 is fed by means of a further conveyor between a cutter roller 6 and a support roller 7 where individual portions are cut from the lattice of the shape and size required for the food products. The individual portions 1c are then transported to an oven, as shown in FIG. 1, where they are baked to form biscuits.

Figure 2:
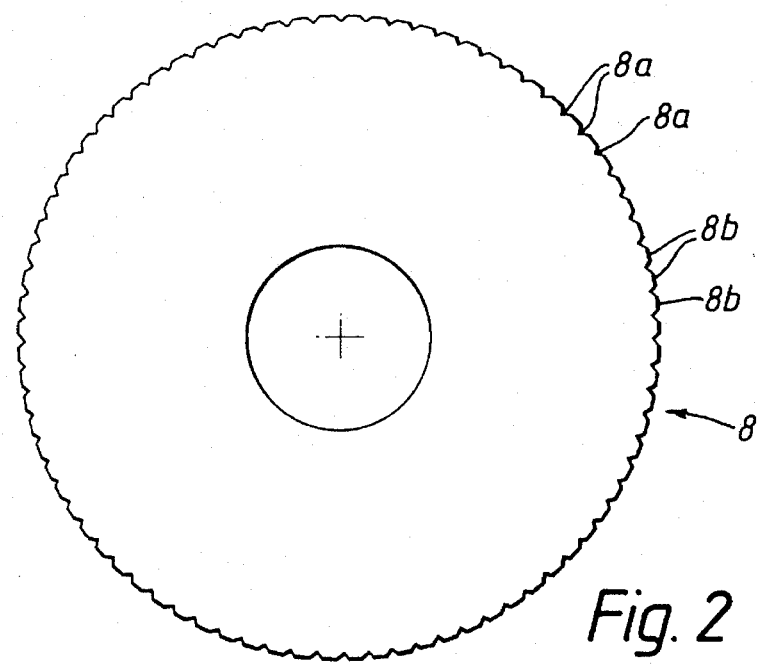
FIG. 2 is an end view, on a larger scale than FIG. 1, of one of a pair of grooved rollers that forms part of the apparatus shown in FIG. 1.
Figure 3:
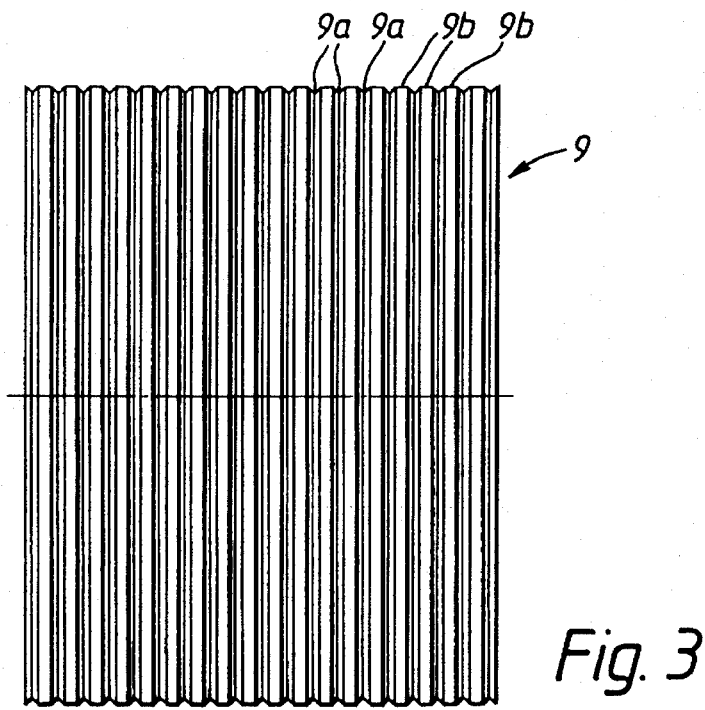
FIG. 3 is a side view, on the same scale as FIG. 2, of the other roller of the pair of grooved rollers shown in FIG. 1.
Figure 4:
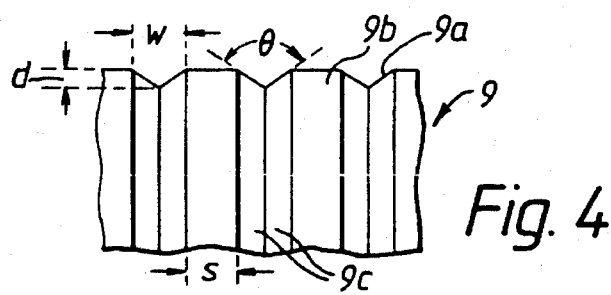
FIG. 4 is a side view, on a larger scale than FIG. 3, of a portion of the curved surface of the roller of FIG. 3.

The pair of grooved rollers 5 consist of an upper roller, indicated generally by the reference numeral 8 and shown in FIG. 2 and a lower roller, indicated generally by the reference numeral 9 and shown in FIG. 3. The rollers 8 and 9 are rotatably mounted about axes in the same vertical plane and are arranged with their curved surfaces in contact with each other. Drive means (not shown) are provided to enable the rollers to be driven in opposite senses.

The upper roller 8 has longitudinally-extending grooves 8a indented in its curved surface. The portions of the curved surface or lands 8b between the grooves 8a are of uniform width along their length. The lower roller 9 has indented in its curved surface grooves 9a which extend circumferentially around the roller and has lands 9b of uniform width between the grooves. As can be seen in FIG. 4, each groove 9a has a pair of side walls 9c that are inclined towards each other and meet at the base of the groove at an angle $\theta$, the line along the base of each groove being substantially straight. Each groove 9a is of a depth d and is of a width w at the curved surface of the roller. The lands 9b between the grooves 9a are each of a width s. The grooves 8a have the same values for $\theta$, d and w as the grooves 9a, and the width of lands 8b between the grooves 8a is also the same as the width of the lands 9b.

As an example of suitable dimensions, the angle $\theta$ may be 110° the depth d of each groove 8a and 9a may be 0.75 mm and the width w at the curved surface of the roller 2.14 mm. The width s of each land 8b and 9b may be 2.0 mm. The diameter of the rollers 8 and 9 may be 105 mm, and the length of each of the rollers 76.7 mm.

Referring to the operation of the grooved rollers 8 and 9, the sheet of dough 1a, which has been reduced in thickness by the two pairs of gauge rollers 3 and 4, is fed to the grooved rollers, which initially may be out of contact with each other, but are rotating in opposite senses. When the sheet of dough 1a first enters the nip between the rollers 8 and 9, the rollers can be closed together bringing the lands 8b and 9b into contact with each other along the lengths of the rollers. Then, as the sheet 1a passes between the rollers 8 and 9, the dough enters the grooves 8a and 9a in the rollers and the part of the dough that contacts the lands 8b and 9b of the rollers is pushed into the grooves. With the rate of supply of the dough to the rollers 8 and 9 and the rate of rotation of the rollers suitably selected, the grooves 8a and 9a in the rollers are filled with dough without undue compression of the dough and without exerting undue force on the rollers which would cause the rollers to move out of contact with each other over any part of their length. Thus, all the dough is formed into ridges, the dough sheet 1a having imparted to its upper surface an array of ridges corresponding to the grooves 8a of the roller 8, the ridges extending in a direction transverse to the direction of travel of the dough through the rollers. The lower roller 9 imparts to the lower surface of the dough sheet 1a an array of ridges corresponding to the grooves 9a extending in a direction parallel to the direction of travel of the dough through the rollers. Thus, the ridges on the upper surface of the dough intersect the ridges on the lower surface at an angle of 90°. The lands 8b and 9b, they where contact each other, form apertures between the ridges and, as the lands are of equal width, the apertures formed in the dough sheet 1a are square. Accordingly, a lattice configuration is imparted to the dough, the lattice being formed only by the intersecting ridges. The bases of the ridges are connected to one another whwere they intersect.

Figure 5:
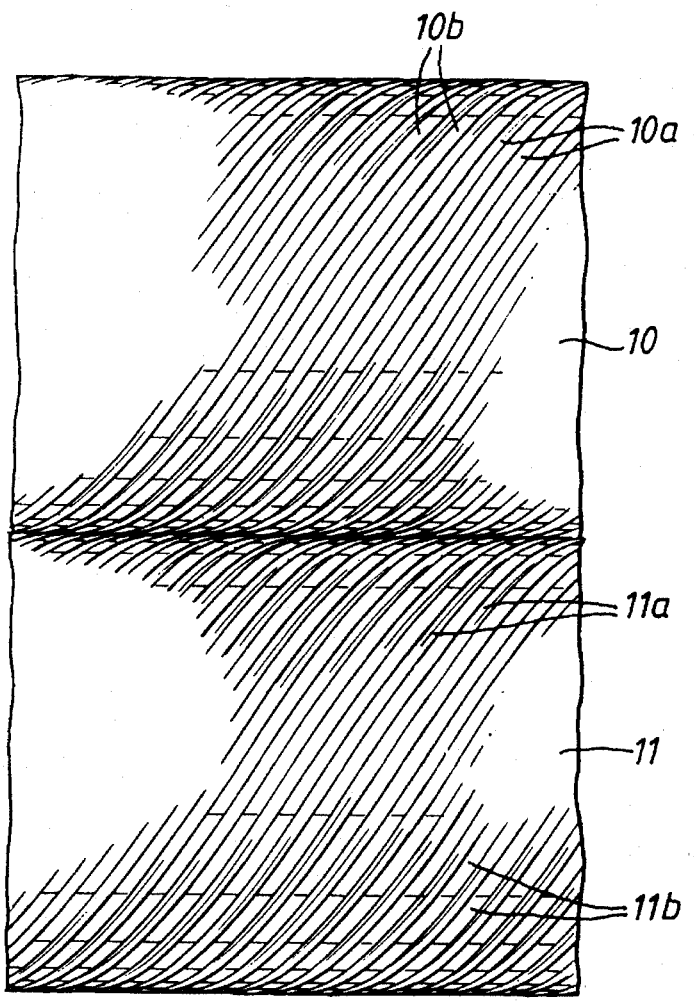
FIG. 5 is a view of an alternative pair of grooved rollers to that shown in FIGS. 2, 3 and 4 and suitable for use in the apparatus of FIG. 1, the view being in the direction in which dough is fed to the rollers.
Figure 8:
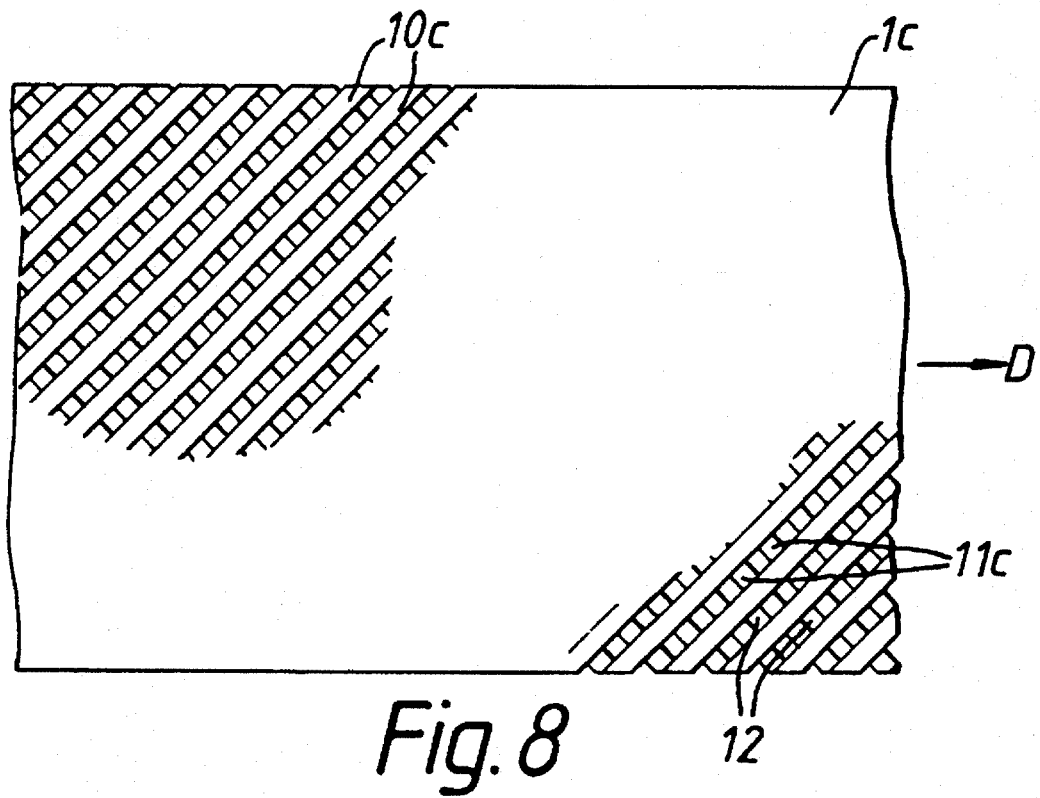
FIG. 8 is a plan view of a dough lattice emerging from the rollers of FIGS. 5.

The grooved rollers 8 and 9 can be replaced by a pair of grooved rollers 10 and 11 each having a series of helically-extending grooves 10a and 11a, respectively, and lands 10b and 11b, respectively, between the grooves as shown in FIG. 5. Such rollers impart arrays of ridges 10c and 11c, respectively, to a sheet of dough 1c as can be seen in FIG. 8. The ridges 10c and 11c are imparted in a similar manner to the ridges imparted by the rollers 8 and 9, but in the case of the rollers 10 and 11, the helical arrangement of the grooves 10a and 11a rotating in opposite senses to each other mean that the ridges 10c and 11c are inclined at angles of 45° to the direction of travel of the dough emerging from the nip of the rollers, the ridges 10c being inclined in the opposite sense to the ridges 11c. The ridges 10c and 11c define square apertures 12 between the ridges, the diagonals of the squares extending in the direction of travel of the dough sheet.

Figure 6:
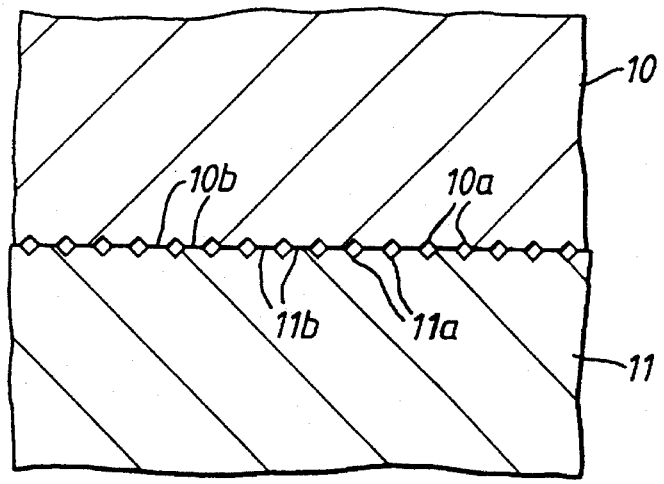
FIG. 6 shows a portion of a vertical cross-section through the rollers of FIG. 5 at one instant in the process.
Figure 7:
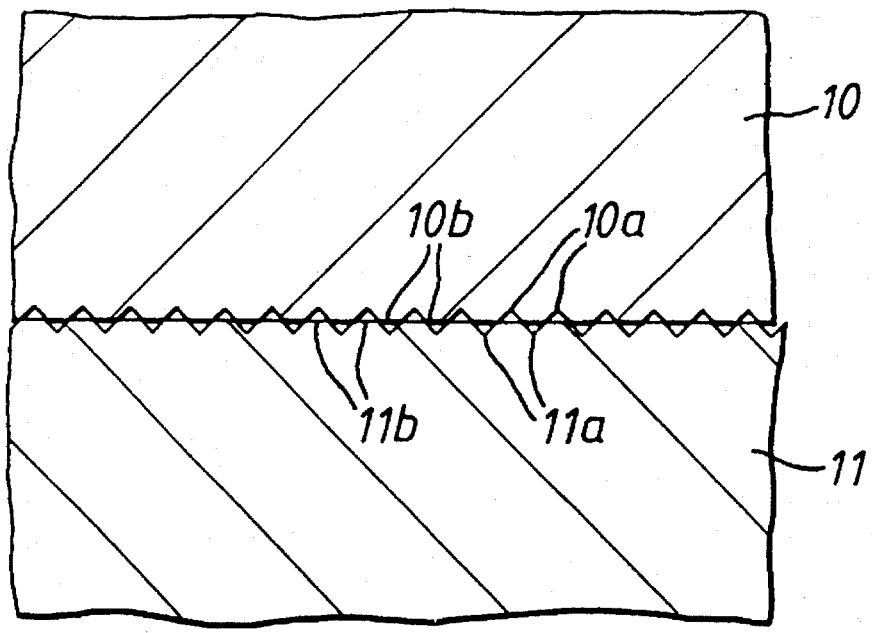
FIG. 7 shows a portion of a vertical cross-section through the rollers of FIG. 5 at another instant in the process.

FIG. 6 shows a cross-section through a portion of the contacting rollers 10 and 11 at the instant when the grooves 10a of the upper roller 10 are exactly aligned with the grooves 11a of the lower roller 11 in the centre of the nip. FIG. 7 shows the same view as FIG. 6 but at an instant later when the grooves 10a of the upper roller 10 are opposite the lands 11b of the roller 11 and the grooves 11a are opposite the lands 10b.

The shape of the apertures 12 can be altered from square to rhomboidal as the dough lattice 1c emerges from the rollers 10 and 11 by increasing the tension of the dough lattice. That can be achieved by increasing the speed of the conveyor for transporting the dough lattice 1c to the cutter roller 6.

An example of suitable dimensions for the rollers 10 and 11 is as follows:

The rollers 10 and 11 may be of a diameter of 15 cm and a length of 30 cm. The side walls that define each of the grooves 10a and 11a may meet at the base of the groove at an angle of 92.5°. The width of each groove at the curved surface of the roller may be 2.87 mm and the depth of each groove may be 1.38 mm. The width of each of the lands between adjacent grooves may be 2.8 mm.

The grooved rollers 8, 9 and also the grooved rollers 10, 11 may be made from acetal, or have an acetal coating. Alternatively, they may be made from metal.

Although each of the pails of rollers 8, 9 and 10, 11 are formed with grooves of the same dimensions on each roller of the pair, the dimensions of the grooves may differ, one roller having, for example, shallower grooves than the other.

Figure 9:
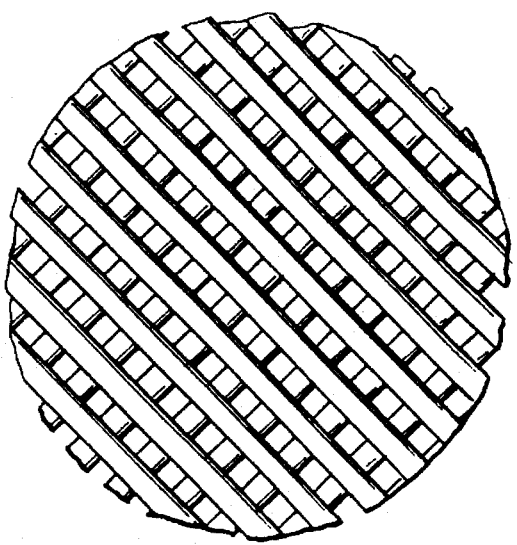
FIG. 9 is one form of a biscuit produced by the process of the invention.
Figure 10:
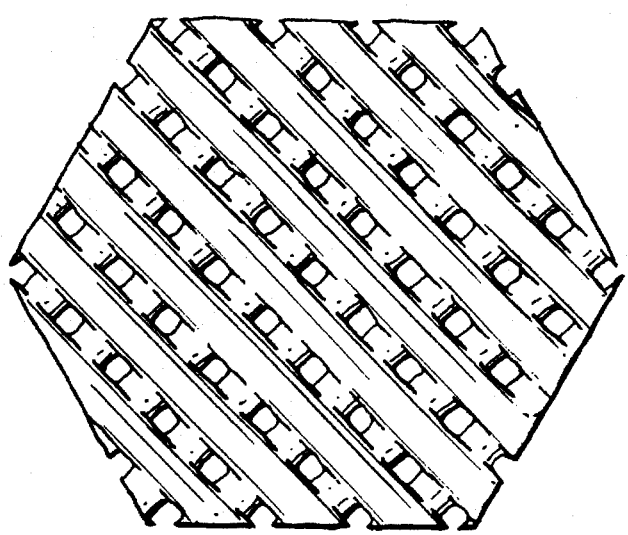
FIG. 10 is a second form of biscuit produced by the process of the invention.

Two examples of biscuits formed in accordance with the process of the invention are shown in FIGS. 9 and 10, the biscuit shown in FIG. 9 being of circular shape and of a relatively fine lattice, whereas the hexagonally-shaped biscuit shown in FIG. 10 has thicker ridges resulting in a coarser lattice.

The following Examples illustrate the invention:

EXAMPLE 1

A dough was formed, the composition of which was as follows:

|  | Weight (Kgs.) |
| --- | --- |
| Biscuit Flour | 15.800 |
| Fat (Palm Hardened Soya) | 1.900 |
| Lecithin | 0.025 |
| Granulated sugar | 1.300 |
| Malt Extract | 0.375 |
| Glucose syrup | 0.250 |
| Ammonium Bicarbonate | 0.200 |
| Sodium Bicarbonate | 0.100 |
| Water | 4.727 |
| Acid Calcium Phosphate | 0.010 |
| Sodium Metabisulphite | 0.002 |
| Enzyme (Neutrase) | 0.0015 |

To form the dough, all the above ingredients were added to a mixing bowl of a Vicars II high speed mixer having a sprag blade. The mixer was operated at a slow speed of 30 rpm for 1 minute and the speed was then increased to 60 rpm. Mixing at the higher speed was continued until the dough reached a temperature of 35° C. The dough was then left to stand for 15 minutes.

Using apparatus similar to that described above with reference to FIG. 1 of the accompanying drawings, the dough was formed into a sheet by passing it through a three roll sheeter and two pairs of gauge rollers. The feeder roll of the three roll sheeter was arranged to rotate at a speed of 0.40 rpm, and the rates of rotation of the first and second pairs of gauge rollers were 0.82 rpm and 1.55 rpm, respectively. The gaps between the first and second pairs of gauge rollers were 6.0 mm and 3.3 mm, respectively.

The flat sheet of dough emerging from the second pair of gauge rollers was then fed to a pair of grooved rollers similar to those described with reference to FIG. 5, each of the grooved rollers having a series of helically-extending grooves indented in their curved surfaces and being arranged to impart ridges inclined at an angle of 45° to the direction of travel of the dough through the rollers. The rollers were of a length of 30 cm and a diameter of 15 cm. Each of the grooves was defined by a pair of side walls that met at the base of the groove at an angle of 92.5°. The width of each groove at the curved surface of the roller was 2.87 mm and the depth of each groove was 1.38 mm. The width of each of the lands between adjacent grooves was 2.8 mm. The rollers were rotated in opposite senses at rates of 4.14 rpm with their curved surfaces in contact. A dough lattice emerged from the grooved rollers having one array of ridges extending at 45° in one sense to the direction of travel of the dough through the rollers, and another array of ridges extending at 45° in the opposite sense. The ridges defined substantially square apertures.

Hexagonally-shaped portions having equal sides of a length of 25 mm were cut from the dough lattice, and those portions were fed to a forced convection travelling baking oven divided into three sections. The temperatures in the first, second and third sections of the oven were 220° C., 190° C., and 175° C., respectively. The baking time was 4 minutes.

The resulting biscuits, which had a well-defined lattice configuration, were oil sprayed to an extent that the oil content of the biscuit was 10% by weight based on the weight of the sprayed biscuit. The sprayed biscuits were then dusted with an external flavouring material.

EXAMPLE 2

A dough was formed from the following ingredients:

|  | Weight (g) | % |
| --- | --- | --- |
| Low leach potato flake | 1135 | 45.80 |
| Bakasnak | 300 | 12.10 |
| Salt | 11 | 0.44 |
| GMO:Oil (1:1) | 30 | 1.21 |
| Water | 1000 | 40.40 |

(GMO:Oil is a glycerol mono-oleate and palm oleine blend which was used in the proportions of one part by weight of glycerol mono-oleate to one part by weight of palm oleine. Bakasnak is a pre-gelled modified waxy cornstarch.)

To form the dough, the potato flake, Bakasnak and salt were placed in a mixing bowl of a small Stephan mixer and mixed for 30 secs. at 1500 rpm. Mixing was continued whilst the GMO:Oil was poured onto the mix through a hole in the lid of the mixer. That operation took 30 secs. The water was then added in a similar manner but over a period of 1 minute. Mixing of the dough was continued until the temperature of the dough reached 30° C.

The dough was then removed from the mixer and placed into the hopper of the three roll sheeter of the apparatus used in Example 1. It was passed through the two pairs of gauge rollers to reduce the thickness of the sheet. The feeder roll of the three-roll sheeter was arranged to rotate at a speed of 0.60 rpm, and the rates of rotation of the first and second pairs of gauge rollers were 0.89 rpm and 1.64 rpm, respectively.

The gaps between the different sets of rollers were as follows:

| Three roll sheeter | 12.2 mm |
| --- | --- |
| First gauge rollers | 8.1 mm |
| Second gauge rollers | 4.3 mm |

The sheet of dough emerging from the second pair of gauge rollers was then fed to the grooved rollers of Example 1, but arranged to rotate in opposite senses at rates of 3.90 rpm.

A well-defined dough lattice was produced by the grooved rollers.

Individual oval pieces of dough (which had a major diameter of 5 cm and a minor diameter of 4 cm) were cut out and passed into a forced convection travelling baking oven, divided into three sections. The temperatures of the sections of the oven were measured as being 255° C., 240° C., and 200° C., respectively. The baking time was 3.25 mins. The biscuits emerging from the oven had a clear lattice structure with substantially square apertures.

EXAMPLE 3

A dough was formed from the following ingredients:

|  | Weight (g) | % |
| --- | --- | --- |
| Pregel Polenta | 1275 | 35.1 |
| Salt | 16.5 | 0.5 |
| Potato Granules | 312.5 | 8.6 |
| Bakasnak | 745.5 | 20.5 |
| Water | 1250.0 | 34.4 |
| Glycerol mono-oleate | 83.5 | 0.9 |

To form the dough, using a Stephan mixer UMM/SK44E, the salt, pregel polenta, bakasnak and potato granules were dry mixed for 30 secs. The glycerol mono-oleate was then added over a period of 15 secs. and mixing was continued for a further 15 secs. The water was then added over a period of 1 minute, 20 secs. of further mixing.

The dough was then removed from the mixer and placed into the hopper of the three-roll sheeter of the apparatus used in Example 1. It was passed through the two pairs of gauge rollers to reduce the thickness of the sheet. The feeder roll of the three-roll sheeter was arranged to rotate at a speed of 0.60 rpm, and the rates of rotation of the first and second pairs of gauge rollers were 0.89 rpm and 1.64 rpm, respectively.

The gaps between the different sets of rollers was as follows:

| Three roll sheeter | 12.2 mm |
| --- | --- |
| First gauge rollers | 8.1 mm |
| Second gauge rollers | 4.3 mm |

The sheet of dough emerging from the second pair of gauge rollers was then fed to the grooved rollers of Example 1, but arranged to rotate in opposite senses at rates of 3.90 rpm.

A well-defined dough lattice was produced by the grooved rollers.

Individual oval pieces of dough (which had a major diameter of 5 mm and a minor diameter of 4 mm) were cut out and passed into a forced convection travelling baking oven, divided into three sections. The temperatures of the sections of the oven were measured as being 280° C., 270° C., and 180° C., respectively. The baking time was 3.25 mins. The biscuits emerging from the oven had a clear lattice structure with susbtantially square apertures.

EXAMPLE 4

A dough was formed, the composition of which was as follows:

|  | Weight (Kgs.) |
| --- | --- |
| Biscuit Flour | 14.500 |
| Icing sugar | 3.420 |
| Salt | 0.183 |
| Malt Extract | 0.375 |
| Soda | 0.095 |
| Cane Syrup | 0.600 |
| Fat (Palm Hardened Soya) | 2.700 |
| Ammonium Bicarbonate | 0.065 |
| Water | 2.000 |
| Sodium Metabisulphite | 0.004 |
| Water | 0.500 |

To form the dough, all the above ingredients were added to a mixing bowl of a Vicars II high speed mixer having a sprag blade. The mixer was operated at a slow speed of 30 rpm for 1 minute and the speed was then increased to 60 rpm. Mixing at the higher speed was continued until the dough reached a temperature of 42° C.

Using apparatus similar to that described with reference to FIG. 1, the dough was formed into a sheet by passing through a three roll sheeter and between two pairs of gauge rollers.

The flat sheet of dough emerging from the second pair of gauge rollers was fed to a pair of grooved rollers similar to those described with reference to FIG. 5 and having the same dimensions as those used in Example 1. A dough lattice emerged from the grooved rollers.

The rates of rotation of the rollers were as follows:

|  | rpm |
| --- | --- |
| Feeder roller of three roll sheeter | 0.49 |
| First gauge rollers | 0.83 |
| Second gauge rollers | 1.69 |
| Grooved rollers | 4.14 |
| Cutter rollers | 4.14 |

The speed of the conveyors between the rollers were as follows:

|  | m/sec. |
| --- | --- |
| Conveyor between three roll sheeter and first gauge rollers | 0.0045 |
| Conveyor between first and second gauge rollers | 0.0060 |
| Conveyor between second gauge rollers and grooved rollers | 0.0125 |
| Conveyor between grooved rollers and cutter rollers | 0.0357 |
| Conveyor from cutter rollers to oven | 0.0313 |

Discs of dough of 45 mm in diameter were cut from the dough sheet at each stage and the dough thicknesses were measured. The thicknesses and weights of the disc were as follows:

|  | Thickness mm | Weight grams |
| --- | --- | --- |
| Dough leaving feeder | 10.8 | 23.5 |
| Dough leaving first gauge rollers | 5.8 | 12.6 |
| Dough leaving second gauge rollers | 3.2 | 7.2 |
| Dough leaving grooved rollers | 2.6 | 2.2 |

Hexagonal portions with equal sides of a length of 25 mm were cut from the dough lattice by the cutter rollers. Those portions were fed to a forced convection travelling baking oven divided into three sections. The temperatures in the first, second and third sections of the oven were 185° C., 205° C., and 160° C., respectively. The baking time was 3.5 minutes.

The resulting lattice biscuits were allowed to cool and then coated on one side with chocolate using an Arcall sprayer, the chocolate having first been tempered in a Sollich Turbo Temperer. The biscuits were conveyed through the sprayer on a conveyor belt travelling at a speed of 1.5 cm/sec. It was found that a coating on one surface of the lattice was obtained without completely closing the apertures of the lattice. After spraying, the chocolate coated biscuits were conveyed through a Sollich cooling tunnel to effect setting of the chocolate. The amount of chocolate on each coated biscuit was 36.37% by weight, based on the weight of the coated biscuit.

What we claim is:

1. A process for producing baked food products, which comprises:

forming a flat sheet of dough;

feeding the flat sheet to a nip between a pair of contra-rotating rollers arranged with their curved surfaces in contact with each other, each of the rollers having grooves indented in its curved surface, and wherein the rollers push the dough into the grooves and form the dough into a lattice comprising an array of ridges imparted to the dough by one of the rollers, which ridges are spaced apart from each other and substantially all of which extend in substantially the same as each other, and an array of ridges imparted to the dough by the other roller, which ridges are spaced apart from each other and substantially all of which extend in substantially the same direction as each other, the direction in which the ridges of one array extend being at an angle to that of the other array so that the ridges of one array intersect the ridges of the other, and the contacting portions of the curved surfaces of the rollers provide apertures in the dough between the intersecting ridges;

cutting portions from the dough lattice; and baking the portions to provide food products having a lattice configuration.

2. The process of claim 1, wherein the dough is made from an ingredient selected from the group consisting of wheat, maize, potato, rice and mixtures thereof.

3. The process of claim 2, wherein the dough contains fat.

4. The process of claim 3, wherein the dough contains sugar.

5. The process of claim 2, wherein the dough contains sugar.

6. The process of claim 1, including forming the dough into a flat sheet before it is fed to the grooved rollers by passing it between one or more pairs of smooth rollers.

7. The process of claim 1, wherein the ridges imparted to the dough by one of the rollers intersect the ridges imparted to the dough by the other roller at an angle of about 90°.

8. The process of claim 1, wherein the apertures between the ridges of the dough at least immediately before it leaves the grooved rollers are substantially square.

9. The process of claim 1, wherein one of the rollers is formed with an array of longitudinally extending grooves, and the other roller is formed with an array of grooves extending circumferentially of the other roller.

10. The process of claim 1, wherein one or each of the rollers is formed with one or more grooves extending helically around the roller.

11. The process of claim 10, wherein the ridges of both of the arrays imparted to the dough extend in directions which are inclined at angles of about 45° to the direction of travel of the dough through the rollers, and the ridges of one array are inclined in the opposite sense to the ridges of the other array.

12. The process of claim 1, wherein each groove has a pair of side walls that meet at the base of the groove at an angle within the range of from about 60° to 120°.

13. The process of claim 12, wherein each groove has a pair of side walls that meet at the base of the groove at an angle within the range of from about 90° to 110°.

14. The process of claim 1, wherein the depth of each groove is within the range of from about 0.50 to 2.50 mm.

15. The process of claim 14, wherein the depth of each groove is within the range of from about 0.75 to 1.50 mm.

16. The process of claim 1, wherein the width of each groove at the curved surface of the roller is within the range of from about 1.73 to 8.66 mm.

17. The process of claim 16, wherein the width of each groove at the curved surface of the roller is within the range of from about 2.14 to 3.00 mm.

18. The process of claim 1, wherein the grooves are separated by lands, and the width of each land between adjacent grooves is within the range of from about 1.00 to 8.00 mm.

19. The process of claim 18, wherein the width of each land between adjacent grooves is within the range of from about 2.00 to 3.00 mm.

20. The process of claim 12, wherein the cross-sectional area of each groove is within the range of from about 0.43 to 10.82 mm².

21. The process of claim 20, wherein the cross-sectional area of each groove is within the range of from about 0.80 to 2.25 mm².

22. The process of claim 1, wherein the grooves impart ridges to the dough which extend along substantially straight lines.

23. The process of claim 1, wherein the ridges imparted to the dough extend along wavy lines.

24. The process of claim 1, wherein the grooves are separated by lands, and the lands of the rollers are of uniform width so that the ridges imparted to the dough are uniformly spaced from each other.

25. The process of claim 1, wherein the food products are treated by the addition of one or more substances to their outer surfaces after baking.

26. The process of claim 25, wherein the food products are coated on one side with chocolate which is sprayed onto the food products after baking.

27. Apparatus for producing baked food products, which comprises:

a pair of rollers arranged for rotation in opposite directions to each other and having curved surfaces on each of said rollers in contact with each other to define a nip between the rollers, each of the rollers having an array of grooves indented into its curved surface, the grooves of one of the rollers being spaced apart from each other and substantially all of which extend in substantially the same direction as each other, the grooves of the other roller being spaced apart from each other and substantially all of which extend in substantially the same direction as each other, the grooves of one of the rollers extending at an angle to the grooves of the other roller so that, in the nip between the rollers, the grooves of one roller intersect the grooves of the other roller, and the curved surfaces of the rollers between the grooves being in contact with each other;

means for feeding a dough to the nip of the rollers whereby the rollers form a dough lattice;

means for cutting portions from the dough lattice formed by the rollers; and means for baking the portions cut from the dough lattice.

28. The apparatus of claim 27, wherein one of the rollers has an array of longitudinally extending grooves, and the other roller has an array of grooves extending circumferentially of the other roller.

29. The apparatus of claim 27, wherein the grooves of at least one of the rollers extend helically around the roller.

30. The apparatus of claim 29, wherein the helically extending grooves extend at an angle of about 45° to the axis of the roller.

31. A baked food product having a lattice configuration and produced by a process as claimed in claim 1.

32. The process of claim 1, wherein said contra-rotating rollers are arranged with their axes parallel to each other.

33. The apparatus of claim 27, wherein said pair of rollers have axes which are parallel to each other.

* * * * *

UNITED STATES PATENT AND TRADEMARK OFFICE
CERTIFICATE OF CORRECTION

PATENT NO. : 5,614,237
DATED : March 25, 1997
INVENTOR(S) : Andrew E.C. Clow, Brian D. Hill and Debra Rycraft It is certified that error appears in the above-indentified patent and that said Letters Patent is hereby corrected as shown below:

```
Col. 2, line 30, delete the comma ",".
Col. 3, line 15, delete the comma ",".
Col. 7, line 9, delete "they where" and insert --where they--;
       line 58, delete "pails" and insert --pairs--.
Col. 10, line 12, delete "was" and insert --were--.
Col. 12, line 4, after "same" insert --direction--.
Col. 13, line 17, after "ridges" insert --of each array--.
Col. 14, line 27, delete "contra-rotating" and insert
       --contrarotating--.
```

Signed and Sealed this

Fourteenth Day of October, 1997

Attest:

BRUCE LEHMAN

Attesting Officer

Commissioner of Patents and Trademarks